United States Patent [19]

Scholian

[11] Patent Number: 4,993,162

[45] Date of Patent: Feb. 19, 1991

[54] APPARATUS FOR MEASURING INCLINATIONS OF A COMPONENT

[75] Inventor: Thomas Scholian, Rombach, Switzerland

[73] Assignee: Kern & Co. Ltd., Aarau, Switzerland

[21] Appl. No.: 221,209

[22] Filed: Jul. 19, 1988

[30] Foreign Application Priority Data

Jul. 24, 1987 [CH] Switzerland ............. 02824/87

[51] Int. Cl.$^5$ ............. G01C 9/06; G01C 9/32
[52] U.S. Cl. ................. 33/366; 33/377; 356/249
[58] Field of Search ........... 33/366, 377; 350/112, 350/286; 356/249, 138, 152

[56] References Cited

U.S. PATENT DOCUMENTS

| 2,857,804 | 10/1958 | Rantsch | 356/249 |
| 3,910,704 | 10/1975 | Richarme | 356/249 |
| 4,136,955 | 1/1979 | Aeschlimann et al. | 33/366 |
| 4,307,516 | 12/1981 | Walker | 33/366 |
| 4,666,299 | 5/1987 | Tamaki et al. | 33/366 |

FOREIGN PATENT DOCUMENTS

| 154568 | 9/1985 | European Pat. Off. | |
| 2636706 | 4/1977 | Fed. Rep. of Germany | |
| 309812 | 12/1988 | Japan | 33/366 |
| 1394453 | 5/1975 | United Kingdom | 356/249 |
| 2113383 | 8/1983 | United Kingdom | 33/366 |

Primary Examiner—Thomas B. Will
Attorney, Agent, or Firm—Burns, Doane, Swecker & Mathis

[57] ABSTRACT

The apparatus comprises a stable carrier plate for carrying prisms cemented thereto and conducting an optical ray path from its source to a position sensitive photoelectric receiver. A liquid horizon is provided on the carrier plate for shifting the optical ray path if the apparatus is inclined. A design stable against temperature and mechanical stress with a flat and compact shape is achieved in an easily mountable two axes inclinometer.

13 Claims, 3 Drawing Sheets

APPARATUS FOR MEASURING INCLINATIONS OF A COMPONENT

The present invention relates to an apparatus for measuring inclinations of a component with respect to the direction of gravity. The apparatus comprises an optical source generating the rays of an optical path, an element sensitive to the direction of gravity and deviating the optical path and an element detecting deviations of the optical path caused by the inclinations to be measured. This apparatus also comprises means for conducting the optical path from the source via the gravity sensitive element to the detecting element and a dimensionally stable carrier plate for carrying the source, the deviating element and the detecting element as well as the means for conducting the optical path in a spatially stable defined relation.

BACKGROUND

Known apparatus of this type for detecting inclinations or changes thereof in appliances or components thereof is either functionally separated from but mechanically joined to the appliance or such apparatus comprises individual elements of the appliance and its function is coupled to the function of these elements. Designs of the latter type are known from surveying instruments, e.g. levels and theodolites. Such designs are used as compensators to automatically compensate for any deviation of the instrument from its true horizontal position. Such compensations are effected by shifting the position of the image of a target or an optical path for angular measurements by an amount corresponding to the deviation. European patent application EP-A-154 586 (Sercel) discloses such a design wherein a liquid horizon deviates a ray path for angular measurements.

Known inclinometers that operate independently comprise electrooptic means generating electric output signals representing any deviation from level position. U.S. Pat. No. 4,136,955 discloses such an inclinometer joined to a theodolite. If the theodolite deviates from its true horizontal position its electric output signals representing measured angular values are corrected by a microprocessor using the output signals of the inclinometer.

One object of the present invention is to provide an apparatus for measuring inclinations with an improved optical, mechanical and thermal stability and allowing a simple and reproducible mounting to an appliance.

SUMMARY OF THE INVENTION

An implementation of the invention employs an apparatus including an optical source generating the rays of an optical path; an element sensitive to the direction of gravity and deviating the optical path; an element detecting deviations of the optical path caused by inclinations; means for conducting the optical path from the source via the gravity sensitive element to the detecting element; and a dimensionally stable carrier plate for carrying the optical source, the deviating element and the detecting element all being in a spatially stable defined relation. The means for conducting the optical path are rigidly bonded to each other as well as to the stable carrier plate.

The optical source generating the rays of the optical path and the element detecting deviations of such path are connected to the carrier plate in a spatially stable relation allowing replacement. The carrier plate is made of a transparent material and the gravity sensitive element is a liquid retained on the carrier plate by a bell-like bottomless box. Within such box the liquid has a freely movable surface, and the optical path passes through the carrier plate and is reflected at the free surface of the liquid. The carrier plate is mounted to a component of an appliance in a spatially defined relation without requiring adjustment by means of bearing surfaces provided on that side of the carrier plate which is in direct contact with the liquid.

According to one feature of the invention, the element detecting deviations of the optical path allows measuring inclinations of the apparatus without being mounted to a component of an appliance. The element detecting deviations of the optical path is a position sensitive photodiode of which the electrical output signals represent the inclination in one or two coordinate directions.

According to another feature of the invention, the element detecting deviations of the optical path is a photodiode with four quadrants of which the electrical output signals represent the inclination in two coordinate directions.

According to still another feature, the optical source generating the rays of the optical path is a diode emitting optical radiation. This diode is mounted together with the element detecting deviations of the optical path within a metallic housing. Such housing is bonded to the dimensionally stable carrier plate.

These objects and many advantages of the present invention will be readily apparent to one skilled in the pertinent art from the following detailed description of a preferred embodiment of the invention and the appended claims when considered in conjunction with the drawings.

DETAILED DESCRIPTION OF A PREFERRED EMBODIMENT

Figure 1:
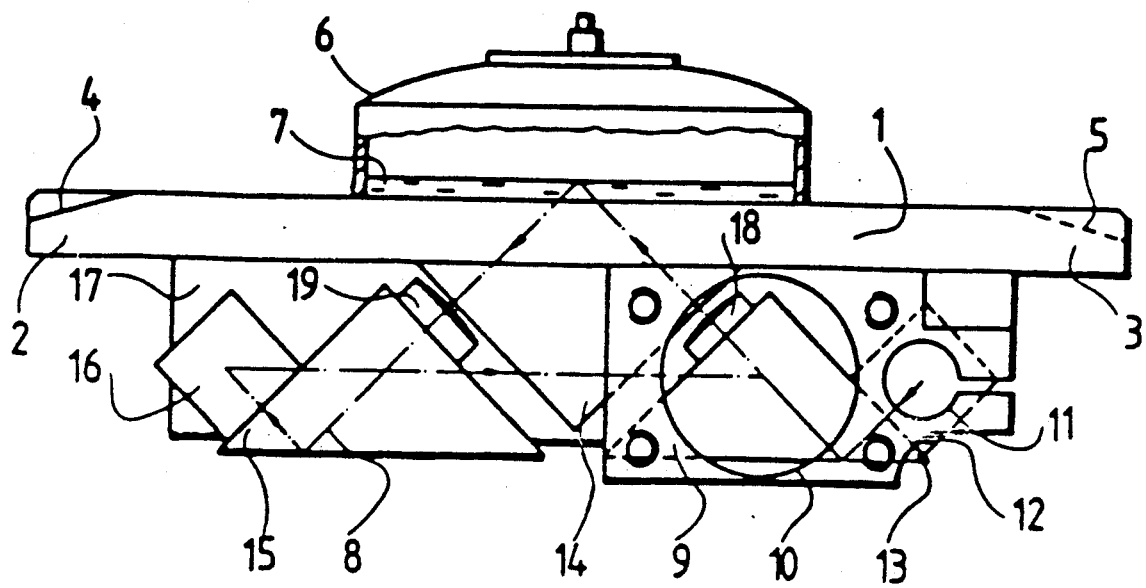
FIG. 1 is a front view of an inclinometer according to the invention.

FIG. 1 shows a rectangular glass plate 1 from the long side. Plate 1 serves as a carrier plate. Its thickness is chosen such that a sufficient mechanical stability will result for the inclinometer. The carrier plate 1 has parts 2, 3 protruding at its ends. Parts 2, 3 are provided with bevel edges 4, 5 serving to mount the inclinometer in a geometrically defined position to a component of an appliance. Inclinations of this appliance are to be measured, and the appliance is not shown in FIG. 1.

A glass top bell 6 is cemented on to the glass plate 1. Bell 6 is partly filled with a liquid 7 being in contact with plate 1. If the inclination of plate 1 with respect to the direction of gravity changes, the surface of the liquid 7 remains level in a manner known as such. But in case of such a tilt, the path 8 of an optical ray of light being generated within the apparatus and totally reflected at the surface of the liquid 7 will shift its position.

Figure 2:
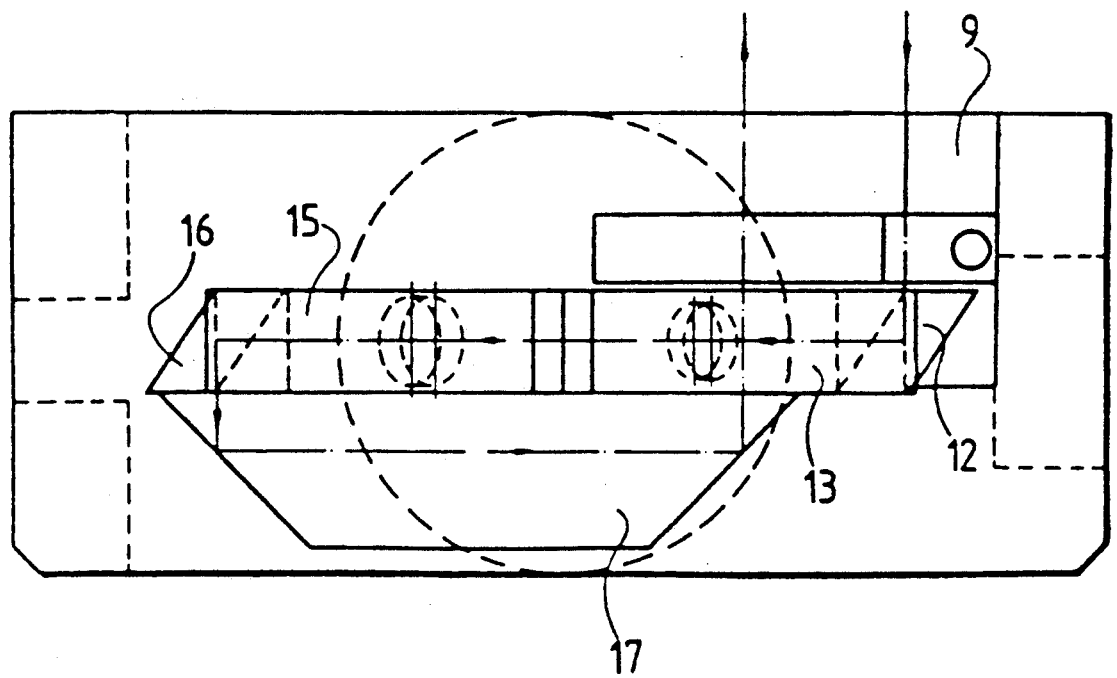
FIG. 2 is a bottom view of the apparatus shown in FIG. 1.
Figures 4, 5:
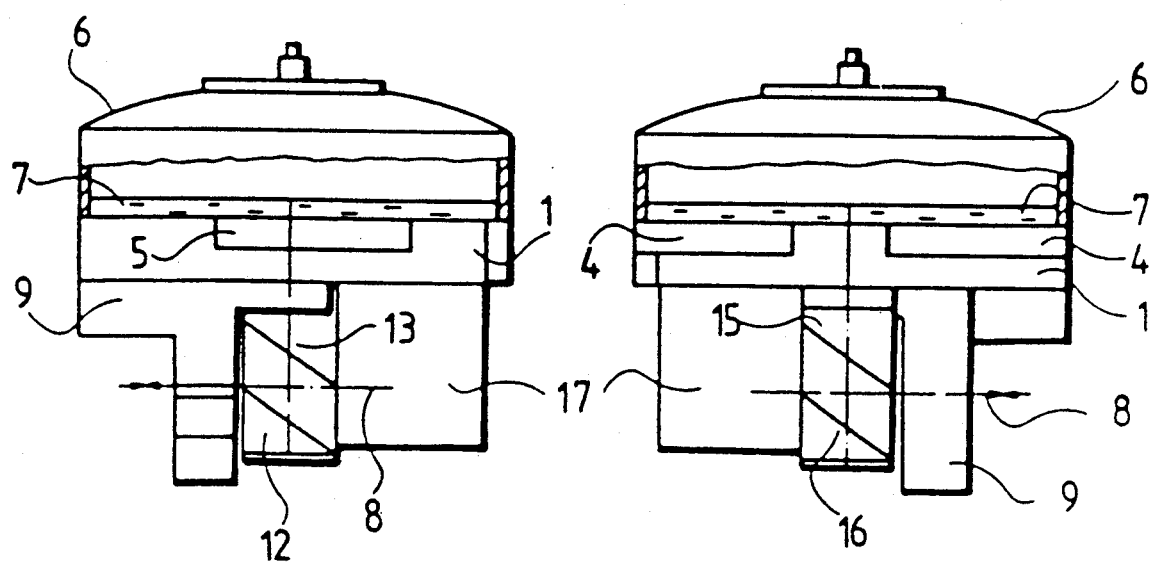
FIG. 4 is a view of the apparatus as shown in FIG. 1 from the left side.
FIG. 5 is a view of the apparatus as shown in FIG. 1 from the right side.
Figure 6:
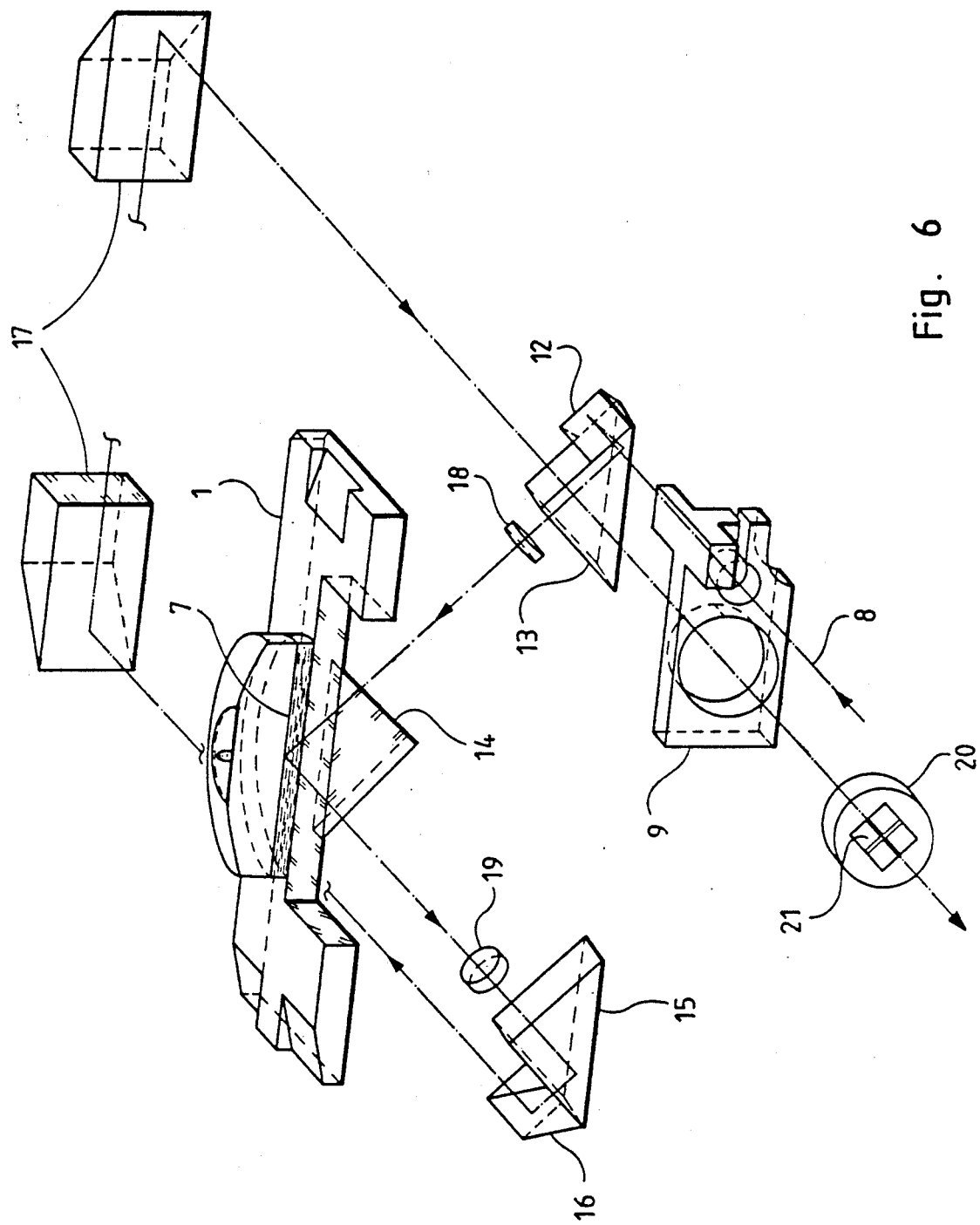
FIG. 6 is an exploded perspective view diagrammatically illustrating the optical path and the elements related thereto.

As shown particularly in FIGS. 2 and 5, a T-shaped metal carrier 9 is cemented to the bottom of the carrier plate 1. The metal carrier 9 has two bores, 10 and 11. Bore 11 receives an infrared light emitting diode (IRED) which generates the rays of path 8 and is not shown in the Figures. Bore 10 receives a position sensitive photodiode 20 indicated in the FIG. 6, which receives the rays of path 8 and detects any shift in its position.

Figure 3:
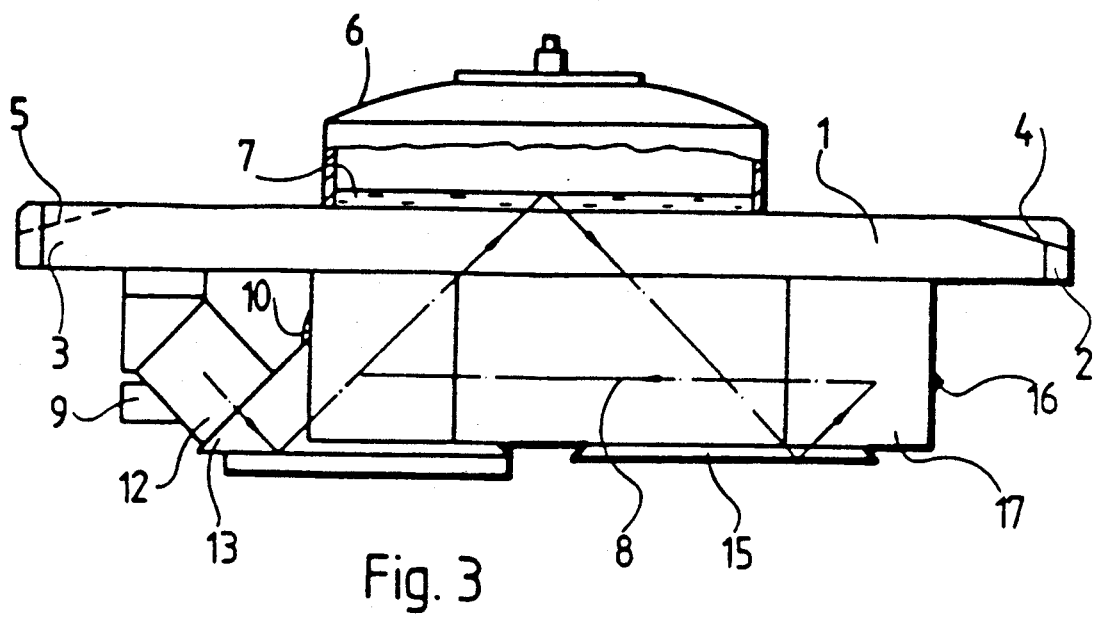
FIG. 3 is a view of the apparatus as shown in FIG. 1 from behind.

The rays of path 8, being generated at the source within the bore 11 proceed via deviating prisms 12 and 13, and a prism 14, through the transparent carrier plate 1 to the surface of the liquid 7 from below at approximately forty-five degrees. At this surface the rays are totally reflected through carrier plate 1 again. They will pass prism 14 once more and then two other deviating prisms 15 and 16, and an elongate prism 17, being conducted by two reflections to the position sensitive photodiode 20 within bore 10 of metal carrier 9, as particularly shown in FIGS. 2, 3 and 6.

As shown in the FIGS. 1 to 5, the prisms 14 and 17 are cemented to the carrier plate 1, prisms 13 and 15 are cemented to prism 17 and the prisms 12 and 16 are cemented to prisms 13 and 15 respectively. A lens 18 and 19 is cemented to prisms 13 and 15 respectively. Lenses 18 and 19 serve for imaging the radiant surface of the source of path 8 on to the position sensitive photodiode. This photodiode 20 may be provided with four quadrants 21. It generates two electric output signals, each being representative of one of two mutually orthogonal coordinates of the position of path 8 on its receiving surface. Changes in position of path 8 according to these two coordinates thus correspond to changes in inclination of the apparatus in two mutually orthogonal directions. In cases where the inclinometer is mounted to a theodolite for compensation of leveling errors, the orthogonal directions for measuring inclinations are preferably oriented parallel to the horizontal direction of the target and to the direction of the tilting axis respectively.

In FIGS. 1 to 6, the same reference numbers designate equal components. An instrument designed for mounting an inclinometer according to this invention may be provided with stop faces for receiving the mounting edges 4 and 5 of the carrier plate 1. Such stop faces preferably define a reference direction of the instrument. So, the inclinometer being completely self contained and functioning independently, may be adjusted to a sufficient precision prior to mounting it to the instrument. No adjustment after mounting is required.

The mounting edges 4 and 5 on the protruding parts 2 and 3 of the carrier plate 1 are preferably provided on that side of plate 1 that carries the liquid 7 with the horizontal surface. This is done to ensure that, for a horizontal orientation of the liquid carrying upper surface of plate 1, the liquid 7 forms a layer with a symmetric distribution of thickness about the center axis of the bell 6. With such a design, shifts of the rays of path 8 due to changes in temperature and corresponding changes in refractive index of liquid layer 7 generate the smallest possible systematic errors in measurement of inclination. A low sensibility against accumulation of external dirt and dust is obtained by conducting the optical path 8 mostly within glass except for the small air gaps between the prisms 13, 14 and 15. A relatively small number of glass to air transitions of path 8 minimizes occurrence of disturbing secondary and multiple reflections.

The infrared emitting source (IRED) for the path 8 as described above may be replaced by any other source of optical radiation suitable for the photoelectric receiver provided in bore 10.

What is claimed is:

1. Apparatus for measuring inclinations of a component with respect to the direction of gravity comprising:
a dimensionally stable carrier plate;
mounting means bonded to said carrier plate;
an optical source replaceably attached to said mounting means for generating the rays of an optical path;
means sensitive to the direction of gravity carried by said carrier plate at a location to be contacted by said rays and serving to deviate said optical path;
detector means replaceably attached to said mounting means and detecting deviations of said optical path caused by inclinations of said component; and
an optical path conducting system made up of first light conducting means rigidly bonded to said dimensionally stable carrier plate and second light conducting means rigidly bonded to said first light conducting means, said light conducting means being constructed and arranged to conduct said optical path from said source via said means sensitive to the direction of gravity to said element detecting deviations of the optical path.

2. Apparatus according to claim 1, wherein said means sensitive to the direction of gravity is a body of liquid and wherein said rays are reflected at a free surface of said liquid.

3. Apparatus as claimed in claim 1, wherein the dimensionally stable carrier plate is provided with bearing surfaces for mounting to said component in a spatially defined relation without requiring adjustment.

4. Apparatus as claimed in claim 1, where said detector means for detecting deviations of the optical path allows measuring inclinations of the apparatus without being mounted to said component.

5. Apparatus as claimed in claim 1, wherein said detector means for detecting deviations of the optical path is a position sensitive photodiode for generating electrical output signals representing said inclination in one or two coordinate directions.

6. Apparatus as claimed in claim 5, wherein said mounting means comprises a metallic housing bonded to said dimensionally stable plate and wherein the optical source generating the rays of the optical path is a diode emitting optical radiation, said diode being mounted together with said detector means with said metallic housing.

7. Apparatus as claimed in claim 1, wherein said detector means for detecting deviations of the optical path is a photodiode with four quadrants for generating electrical output signals representing said inclination in two coordinate directions.

8. Apparatus as claimed in claim 7, wherein said mounting means comprises a metallic housing bonded to said dimensionally stable plate and wherein the optical source generating the rays of the optical path is a diode emitting optical radiation, said diode being mounted together with said detector means within said metallic housing.

9. Apparatus for measuring inclinations of a component with respect to the direction of gravity comprising:
an optical source generating the rays of an optical path;
means sensitive to the direction of gravity and deviating said optical path;
an element detecting deviations of said optical path caused by inclinations of said component;
means for conducting said optical path from said source via said means sensitive to the direction of gravity to said element detecting deviations of the optical path; and
a dimensionally stable carrier plate for carrying in a spatially stable defined relation said means for conducting the optical path, said optical source, said means sensitive to the direction of gravity and the element detecting deviations of the optical path;
said carrier plate being made of a transparent material and the means sensitive to the direction of gravity and deviating the optical path being a liquid retained on the carrier plate by a bell-like bottomless box and having a freely movable surface, said optical path passing through the carrier plate and being reflected at said free surface of the liquid.

10. Apparatus as claimed in claim 9, wherein the bell-like bottomless box, the carrier plate and the means for conducting the optical path are made of a transparent material and are rigidly bonded to each other.

11. Apparatus as claimed in claim 9, wherein said liquid is retained by the bell-like bottomless box in direct contact with one side of said carrier plate and wherein said carrier plate is provided on said one side thereof with bearing surfaces for mounting said apparatus to said component in a spatially defined relation without requiring adjustments.

12. Apparatus for measuring inclinations of a component with respect to the direction of gravity comprising:
a source of light rays adapted to travel along an optical path;
means sensitive to the direction of gravity and deviating said optical path;
means for detecting deviations of said optical path caused by inclinations of said component;
means for conducting said optical path from said source via said means sensitive to the direction of gravity to said means for detecting deviations of the optical path; and
a substantially rigid transparent carrier plate for carrying on one of its sides said means sensitive to the direction of gravity and deviating said optical path, and for carrying on its opposite side in a spatially stable defined relation all of said source, said means for detecting deviations of the optical path, and said means for conducting the optical path.

13. Apparatus as claimed in claim 12, wherein said means sensitive to the direction of gravity is a body of liquid having a free surface extending generally parallel to said one side of said transparent carrier plate when said plate is in a generally horizontal position and wherein said light rays pass through said transparent carrier plate into said liquid, are reflected at the free surface of said liquid, and again pass through said transparent carrier plate.

* * * * *